United States Patent [19]

Witter

[11] Patent Number: 5,002,318

[45] Date of Patent: Mar. 26, 1991

[54] VARIABLE LENGTH PIPE CONNECTOR AND METHOD OF MANUFACTURE AND USE

[75] Inventor: Melvin L. Witter, Dallas, Tex.

[73] Assignee: XYZYX International Corporation, Lake Orion, Mich.

[21] Appl. No.: 414,109

[22] Filed: Sep. 28, 1989

[51] Int. Cl.$^5$ .............................................. F16L 27/12
[52] U.S. Cl. .................................. 285/302; 285/303; 285/321; 169/37; 239/209
[58] Field of Search ................... 169/37; 239/209, 281; 285/321, 302, 303

[56] References Cited

U.S. PATENT DOCUMENTS

| | | |
|---|---|---|
| 3,194,316 | 7/1965 | Faulkner et al. ....................... 169/37 |
| 3,847,392 | 11/1974 | Horwinski ............................ 285/302 |
| 3,958,819 | 5/1976 | Tifft ..................................... 285/302 |
| 4,071,266 | 1/1978 | Mountford ........................... 239/209 |
| 4,083,410 | 4/1978 | Anderson ............................ 285/302 |
| 4,340,082 | 7/1982 | Straus .................................. 285/303 |
| 4,417,626 | 11/1983 | Hanson ................................ 169/37 |
| 4,491,351 | 1/1985 | Galle, Jr. et al. ..................... 285/318 |
| 4,783,100 | 11/1988 | Klein ................................... 285/321 |

FOREIGN PATENT DOCUMENTS

| | | | |
|---|---|---|---|
| 0014094 | 8/1980 | European Pat. Off. ............ 285/321 |
| 2258950 | 3/1974 | Fed. Rep. of Germany ...... 285/321 |

*Primary Examiner*—Eric K. Nicholson
*Attorney, Agent, or Firm*—Brooks & Kushman

[57] ABSTRACT

The pipe connector which may be varied in length and a method for installing the connector is disclosed. Also disclosed is a tool for aiding in the fabrication of a portion of the connector. The connector consists of two telescoping pipes which are joined by the action of a wire spring positioned in recesses in the two pipes. The recesses are designed to allow only one-way movement between the telescoping pipes until such time as a release groove is reached. The release groove is positioned on one of the pipes beyond the normal operating length of the connector. When the wire is positioned in the groove, the pipes may be separated. The tool described allows for on site fabrication of the notch for one of the pipes.

14 Claims, 3 Drawing Sheets

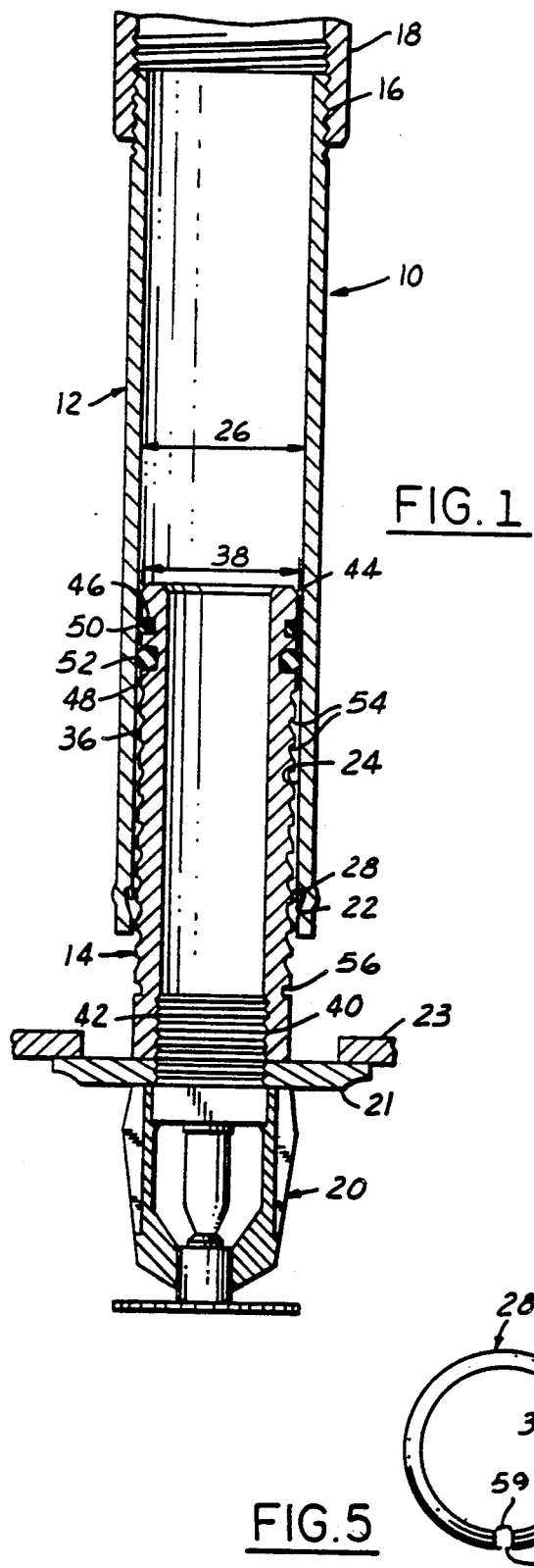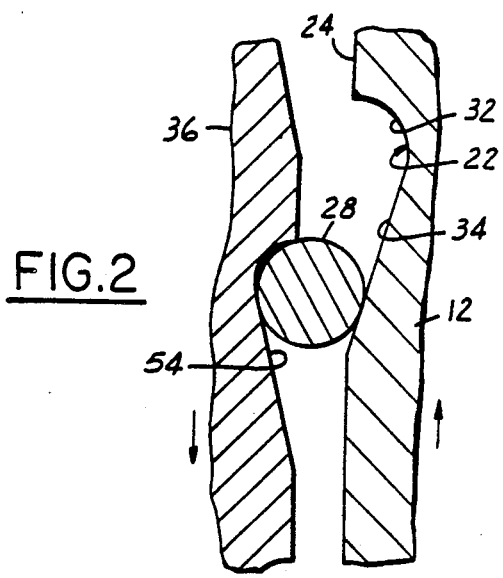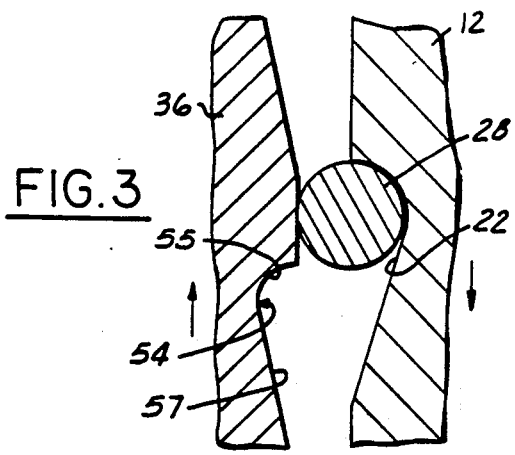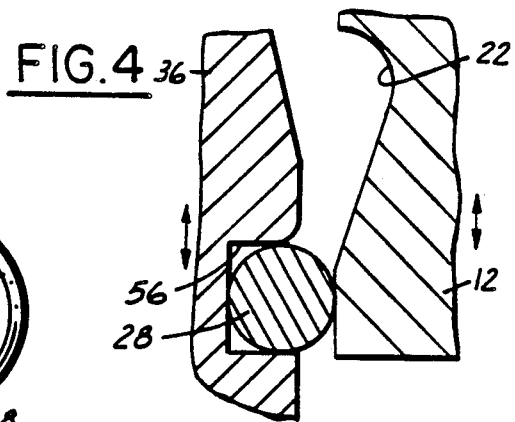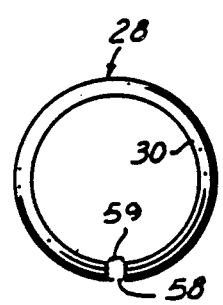

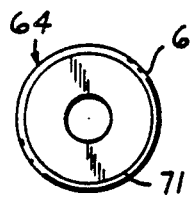
FIG. 9
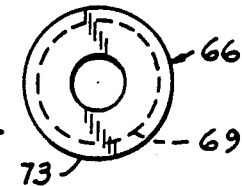
FIG. 12
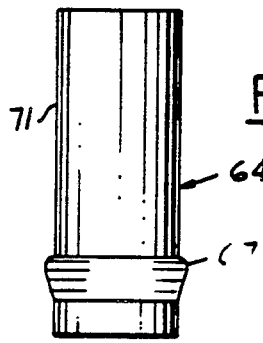
FIG. 8
FIG. 11
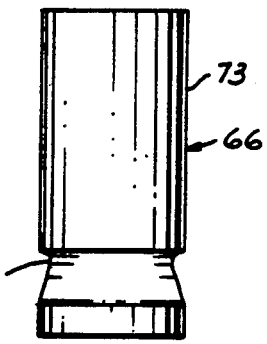
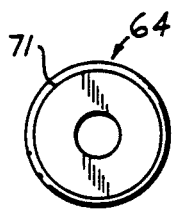
FIG. 10
FIG. 13
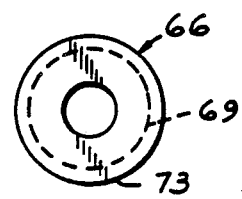
FIG. 14

VARIABLE LENGTH PIPE CONNECTOR AND METHOD OF MANUFACTURE AND USE

TECHNICAL FIELD

This invention relates to pipe connections, their manufacture and use, and more particularly with respect to fire sprinkler head pipe connections and how they might be manufactured and used.

BACKGROUND ART

For many years it has been recognized that overhead fire sprinkler systems aid in limiting the destructive effect of fires. In the last 20 years the growth and use of sprinkler systems has been dramatic. Thus, while just a few million sprinkler heads per year were being installed in the United States in 1970, the number has increased to approximately 28 million sprinkler heads in 1985, and reportedly 40 million sprinkler heads in 1988.

As a result of the benefits of sprinkler systems, the use of sprinkler heads has grown to the point where they are now mandated in substantially all new commercial buildings.

The basic overhead sprinkler system features a source of water which is distributed through the area to be protected by horizontal supply piping concealed above the ceiling. At intervals along the supply piping, also called run pipe, are short sections of drop pipe to which the sprinkler heads are to be attached. Since the distance between the drop pipe and the desired position of the sprinkler head may vary from location to location, the sprinkler head is commonly attached to the drop pipe by an adjustable pipe connection. This adjustable pipe connection has not changed significantly in the past 20 years and generally consists of an outer pipe section having a threaded opening at one end for screwing onto the drop pipe with an expanded section at the other end having interior threads. A second pipe section having O-rings at the top and threads on its outer surface is then screwed into the outer pipe. By varying the amount of the interior pipe which is screwed into the outer pipe, the length of the connector may be varied. The sprinkler head is then screwed into the lower portion of the inner pipe.

Although the standard type of connection works properly, the close tolerances required for the threading connections between the inner and outer pipe generally require the connector to be assembled off site or for use on site by a skilled worker who must be taken from other jobs for a significant period of time.

OBJECTS, FEATURES, AND ADVANTAGES OF THE INVENTION

An object of the present invention is to provide a variable length pipe connector which may be used to connect a source and destination of fluid and which can be varied by mere axial movement of the connector.

It is an object of the present invention to provide a connector between a source of fluid and its destination which may be varied in length through telescoping one pipe within another but where the pipes cannot be separated within their operating length range.

It is an object of the present invention to provide a connector between the source of fluid and its destination which can be assembled and partially fabricated on site.

It is another object of the present invention to provide a tool which allows for the partial fabrication of the connector on site.

Another object of the invention is to provide a method for allowing the person installing piping, specifically for installing sprinkler heads, to permit the sprinkler heads to be easily and correctly positioned by the installer.

An advantage of the invention is that it allows for use of greater tolerances than the prior art and does not require highly skilled labor at the job site.

Other objects, features, and advantages of the invention will become readily apparent from the following description and the accompanying drawings.

DISCLOSURE OF INVENTION

Accordingly, the connector of the present invention includes a pair of telescoping pipes and a planar arcuate spring where each of the pipes has a recess, the recesses differing in that when the wire is seated within one recess the remainder of the spring extending beyond the recess is not sufficient to bridge the gap between the telescoping pipes, but where the wire is seated in the other recess the remaining portion of the spring outside the recess extends a distance greater than the gap between the pipes. Also provided is an annular groove on one of the pipes which allows the wire seated in it to be removed from the recess in the other pipe. Also, the invention provides for installation of a fire sprinkler head below a source pipe where a first pipe is attached to the source pipe, a spring is placed upon a second pipe which is then telescopically positioned within the first pipe where a sprinkler head is then attached to the second pipe and fluid is turned on to pressurize the sprinkler head. Also, a tool for extruding a recess in a pipe is provided where a pair of rollers are moved towards one another, where one roller has an annular ridge and the other has an annular trough so that as they are moved towards one another, they cold extrude a notch in the pipe between them.

BRIEF DESCRIPTION OF DRAWINGS

FIG. 1 is a cross-sectional view illustrating the connector of the present invention;

FIG. 2 is an expanded partial cross-sectional view showing how the invention prevents undesired removal of the inner member;

FIG. 3 is a partial cross-sectional view showing how the invention allows stepped insertion of the inner member;

FIG. 4 is a partial cross-sectional view showing how the inner member may be removed;

FIG. 5 is a top view of the spring used in the connector;

FIG. 8 is a side elevated view of the inner roller for the tool;

FIG. 9 is a top view of the inner roller;

FIG. 10 is a bottom view of the inner roller;

FIG. 11 is a side elevated view of the outer roller;

FIG. 12 is a top view of the outer roller;

FIG. 13 is a bottom view of the outer roller; and

FIG. 14 is a flow diagram of steps undertaken in installing a fire sprinkler head.

BEST MODE FOR CARRYING OUT THE INVENTION

Figure 6:
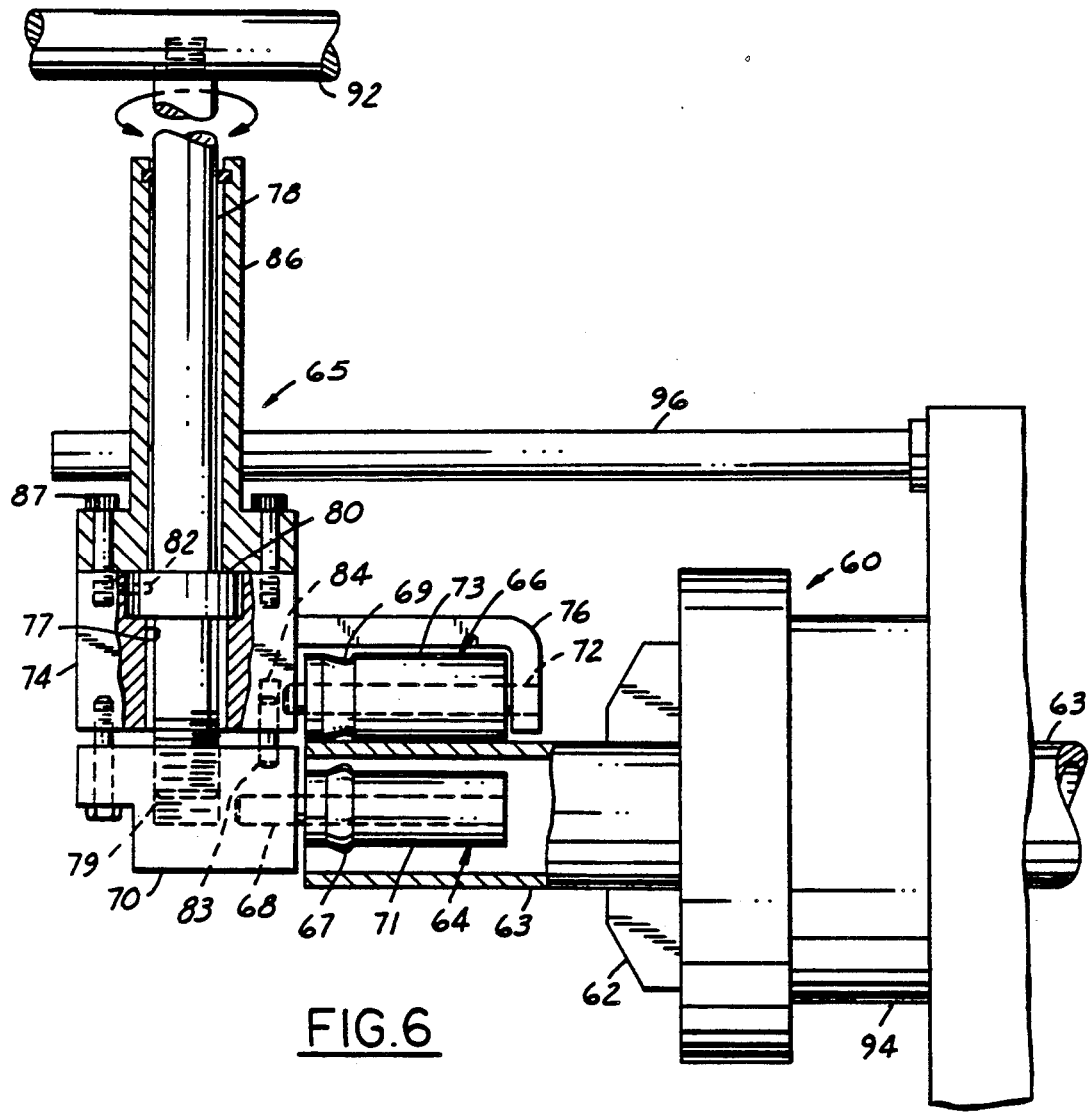
FIG. 6 shows a tool for making a recess in the outer connector member in position to begin work.
Figure 7:
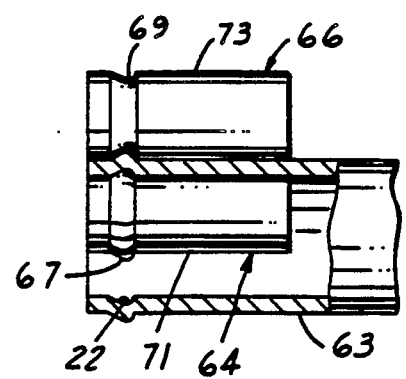
FIG. 7 shows the tool after it has formed the recess.

The pipe connector 10 of the invention has two primary body members 12, 14. The first body member 12 is an outer pipe. It has means at one end for connecting it to a source of fluid to pass through the connector in the form of threads 16 for screwing it onto a pipe 18 supplying the fluid. Since this connector is particularly suited for connecting a depending fire sprinkler head 20 to a drop pipe 18, then this first end is also referred to at the upper end of the outer pipe. By choosing an outer pipe of sufficient length it is possible to eliminate the drop pipe and screw the outer pipe directly to the run pipe. The outer pipe also has in its interior near the lower end opposite the threads a recess 22 in the inner surface 24 which otherwise has a constant or standard diameter 26. But for the recess the area of standard diameter extends a substantial distance into the outer pipe to provide a sealing surface as will be described later. In the preferred embodiment, the inner diameter is constant throughout the outer pipe. After a distance from the lower end sufficient to provide a suitable sealing surface (preferably at least 2½ inches), the inner diameter may be varied. The recess is suitable for selectively holding a planar arcuate spring 28 made of piece of wire 30 having a circular cross-section. The notch cross-section starts at a right angle to the inner surface and proceeds along a downward arc 32 so to form a shoulder. The radius defining the arc 32 is substantially the same as the radius of the wire of spring 28. The arc 32 proceeds approximately 90° and then the cross-section of the notch extends back to the "standard" diameter of the inner surface to form a gradual ramp 34.

The second body member 14 is primarily an inner pipe 36. The maximum effective outer diameter 38 is slightly less than the standard diameter of the inner surface of the outer pipe minus the diameter of the wire 30 of spring 28. At the lower end in the interior of the pipe, there is provided means 40 for connecting the inner pipe with a means for allowing the fluid within the connector to exit from the connector. In the preferred embodiment, this takes the form of threads 42 into which the fluid destination, a sprinkler head 20, is screwed after the threads are treated with a thread sealant. Before the sprinkler head is screwed into the inner pipe it is often mandatory under many local fire codes that a sprinkler escutcheon 21 be threaded on the sprinkler head to cover any hole through the ceiling 23. On the outer surface of the inner pipe, a series of indentations are made. The top end 44 is beveled. Slightly below the top end are two cavities 46 and 48 into which are placed O-rings 50 and 52 of sufficient size so that when the inner pipe is telescoped within the outer pipe the O-rings seal the passageway a gap between the inner pipe and the sealing surface 24. Nitrile Buna-N O-rings composed of compound 434-60 have been found suitable for this purpose.

Below the O-ring cavities there are a series of positioning recesses 54. These recesses extend over a significant portion of the inner pipe and define the extent to which the inner and outer pipes may be moved relative each other and still maintain a connection. These recesses are in the form of circum-axial ramps adapted for uni-directional insertion of the inner pipe. Further down the inner pipe is release groove 56. The release groove has a sufficient depth and width so that when the wire of spring 28 is within the groove, the outer diameter of the spring may be reduced to a diameter less than the inner standard diameter 26 of the outer pipe. Below the groove extends an additional length of piping where interior threads 42 are provided into which the fire sprinkler head might be screwed.

The positioning recesses are of a repetitive cross-section. Like the recess in the outer pipe, the upper cross-sectional portion of each recess 54 begins at an essentially 90° angle to the outer diameter of the pipe, continues along an arc 55 for 90° and then continues back to the outer diameter to form a ramp-like lower portion 57 of the recess. Unlike the outer pipe recess, the radius defining the arc should be less than that of the radius of wire 30 of spring 28. It must be sufficiently less so that when the wire of the spring is completely seated within the recess the outer diameter of the spring is greater than the inner standard diameter of the outer pipe.

Spring 28 consists of wire 30 having a circular cross-section. A wire comprising a spring is bent to form a planar arcuate spring defining a circle 58. There is a gap 59 along the circle between the ends of the spring so to permit mechanical reduction or expansion of the diameter of the spring for purposes outlined below. The center of the wire defines a circle having an at rest diameter which should fall between the outer diameter 38 of the inner tube and the standard diameter of the outer tube 26. AMS-5112 wire spring (ASTM Q2W470) has been found to yield good results in use with the invention.

To position the connector one should determine approximately how far beneath the pipe which will provide the source of fluid, the fire sprinkler head should be positioned. An outer connector pipe is then selected so that preferably the lower end of the outer pipe is an inch or an inch-and-a-half above the desired placement of the fire sprinkler head. The outer pipe is then attached to the source pipe.

The fire sprinkler head is screwed into the inner pipe and the wire spring is placed on top of the inner pipe. The inner tube is then pushed into the outer pipe. The diameter of the spring will briefly be reduced and then return to its original size within the outer pipe recess. In a prefabricated outer pipe the spring may be pre-positioned within the outer pipe recess. As the inner pipe is pushed further into the outer pipe, the spring will become seated within the outer pipe recess to allow further insertion of the inner pipe past the O-rings until the wire is seated between one of the positioning recesses in the inner pipe and the recess in the outer pipe. At such a location an attempt to remove the inner pipe will cause the wire to move along the ramp in the recess of the outer tube until such time as it becomes fully seated within the inner pipe recess at which point it is wedged and cannot be moved further in a downward direction. This is shown in FIG. 2. The inner pipe can still be moved upward which releases the wedging action and allows for further insertion as shown in FIG. 3. When the desired position is reached, the inner pipe is not inserted any further and the fluid may be turned on to the sprinkler head.

Fire sprinkler piping systems are by regulations pressure tested at 200 psi and fire sprinkler heads are manufactured to standards which provide a 175 psi working pressure. When the piping system is charged with fluid, the pressure on the inner pipe will cause it to move slightly downward to its wedged position shown in FIG. 2. The pressure on the tube when the fluid is in the system acts to prevent inadvertent movement of the inner pipe further into the outer pipe. Thus, the sprinkler head will be maintained at the desired position during operation.

If it is desired at any time to change the position of the sprinkler head fluid may be drained from the pipes, releasing the pressure on the inner pipe. The inner pipe can then be further inserted into the outer pipe to reposition the sprinkler head in a higher location. If it is desired to lower the sprinkler head or replace any component of the system, the inner pipe should be inserted until such time as the spring is positioned within groove 56. At this point the inner pipe may be withdrawn since pulling down on the inner pipe in this position will cause the ramp of the outer pipe recess to push the spring into the groove. As shown in FIG. 4, when in the groove the outer diameter of the spring may be compressed to less than the inner constant diameter of the outer pipe and the inner pipe may be completely removed. Once the inner pipe is totally removed, the spring may be mechanically opened and removed from the groove and repositioned on top of the inner pipe to allow for reinsertion.

The relationship between the inner and outer pipes allows the combined length of the two pipes to be continually shortened until such time as the desired position is met, at which point it cannot be withdrawn without further insertion of the inner pipe into the outer pipe. Because of the relationship between the pipes and spring the tolerances in the notches do not have to be as tight as on a threaded connection so long as the basic relationship is maintained. It is envisioned that variations can occur from the preferred depths of the notches so long as when the spring is seated within the outer pipe notch the wire can clear the outer diameter of the inner pipe between position notches. Conversely, the depth of the positioning notches on the inner pipe can be varied so long as when the wire is seated within the notch the outer diameter of the spring is greater than the inner diameter of the outer pipe.

While the connector may be marketed as a whole, the connector is particularly suited for allowing an installer in the field to make the outer pipe. While the details of the inner pipe are sufficiently complex that it should normally be fabricated off-site, the outer pipe is designed so that scrap piping obtained when the drop pipe and running pipe are cut to length may be used to form the outer pipe. Since the pipes used for fire sprinkler systems are standardized it is possible to manufacture the inner tube and spring to be used with standard pipe which may be easily modified as set forth below to become the outer pipe of the connector.

To create an outer pipe to be used with the connector, a length of pipe 63 greater than that of the final outer pipe should be selected. The pipe should then be inserted into a chuck 60 capable of rotating the pipe at preferably 300 rpm. The jaws 62 on the chuck should be tightened holding the pipe in place. Particularly suited for this purpose is the Ridgid 300A power drive made by the Ridge Tool Company (Ridgid is a registered trademark of the Ridge Tool Company). The pipe should extend out of the chuck a distance beyond that which will be worked upon by the tool 65 to be described below. The details of the Ridgid 300A power drive are described in the Ridgid 300A power drive operator's manual and U.S. Pat. Nos. 2,745,670 and 2,756,061, which are incorporated by reference herein.

Once the pipe is positioned and the jaws tightened the tool 65 is inserted in the pipe. Tool 65 consists of an inner roller 64 and outer roller 66, joined so they may be tightened towards one another. The inner roller 64 is essentially cylindrical but for an annular ridge 67 having a cross-section corresponding to the cross-section of the recess in a finished outer tube. The outer roller 66 has a corresponding annular trough 69 similar to the desired recess in the outer pipe. A substantial part 71, 73 of the roller cylinders should extend beyond the recess forming area to allow a polishing effect on the inner surface of the tube. This polished area should correspond to any surface along which the O-rings 50 and 52 may form a seal.

The inner roller 64 is freely rotatable about a pin 68 extending out from the tool end body portion 70. The outer roller 66 is freely rotatable about a pin 72 extending outwardly from the tool movable body portion 74. The outer end of the pin 72 is positioned into arm 76 rigidly joined to the movable body portion. The tool's movable body portion is a central opening 77 to allow movement along a handle rod 78 that passes through the central opening. The rod is screwed into a threaded opening 79 in the end body portion. Movement of the movable body portion along the rod is restricted by a washer 80 positioned on the handle rod by a suitable means such as pin 82. The movable body portion is prevented from rotating about the handle rod by means of pin 83 press-fitted into the end body portion so that it extends into recess 84 in the movable body portion. When the handle rod is placed through the movable body portion and screwed into the end body portion and pin 83 is placed in recess 84, the inner and outer rollers will then be aligned in a spaced relationship along parallel axes.

Also aligned along the handle rod is sleeve 86. The sleeve is positioned on the opposite side of the washer from the end body portion. The sleeve is joined to the movable body portion to prevent relative rotation between these two parts by means of bolt 87 extending through the sleeve and into the movable body portion. The handle rod can freely rotate within the interior of the sleeve and movable body portion. However, axial movement of this rod will be transmitted by washer 80 to the sleeve and movable body portion. At the end of the handle rod, opposite the end body portion, is screwed the handle grip 92.

To use the tool the inner roller 64 is inserted substantially its entire length into the interior of pipe 58. The roller should extend slightly out of the pipe to ensure a smooth surface at the end of the pipe. At this point the inner roller would normally not be in contact with the inner surface of the pipe. The hand grip is then turned so to screw the handle rod further into the end body portion. This will result in the washer moving towards the end body portion and will push the movable body portion towards the end body portion. The net result is that the two rollers will move towards one another, the handle grip 92 should be turned until the outer roller lies flat against the outer surface of the pipe, and the inner roller annular ridge abuts the inner surface of the roller so to hold the tool in place against the pipe. At this point the power should be turned on to the chuck motor 94 so that the pipe will begin rotating at 300 rpm. The tool should be maintained in a set position relative the chuck. The sleeve 86 is designed to allow the handle to be pressed against a stationary object 96 to prevent tool movement but allows further rotation of the handle rod by means of the hand grip. The sleeve also prevents creep by the handle rod along the stationary surface as the hand grip is turned as would occur in the absence of the sleeve. The Ridgid 300A power drive provides a support bar 96 spaced from the center of the chuck which is suitable for this purpose.

With the tool held in place against support bar 96 the rotation of the pipe will impart corresponding rotation of the rollers in opposite directions from one another at 300 rpm. At this point the operator should continue to turn the handle grip 92 so to cause further movement of the rollers towards one another. This effectively accomplishes a cold extrusion of the metal at the annular ridge 67 so to create the desired recess 22 on the inner surface of the pipe. At the same time, the length of the inner roller beyond the annular ridge polishes the inner surface of the pipe creating a sealing surface of sufficient smoothness to allow the O-ring seals to effectively function.

After the creation of the recess and polished surface is completed the chuck may be turned off and the tool removed by reversing the direction in which the hand grips are turned until a sufficient gap is opened to allow removal of the tool.

After the recess and polished surface are created the pipe should be marked at the proper length desired for the outer tube and cut at that position. Use of any suitable tool is acceptable, although the Ridgid 300A power drive can also be used to cut pipe. After the pipe is cut to size the pipe can be again positioned within the chuck and a suitable tool used for adding threads 16. Thus, it is relatively easy to create on-site the necessary outer pipe which when used with a suitable spring and inner pipe can provide a connector of a length chosen at the site.

FIG. 14 shows a flow diagram of the steps that would be used by the person installing the connector at a work site. This would generally consist of selecting the necessary pipe from the scrap created during the construction of the run pipes and the drop pipes. The worker would then cold extrude the pipe to create the necessary recess. The pipe would be cut to length and then threaded so it can be joined to the pipe which will provide the fluid. Of course these four steps may be replaced by buying a prefabricated outer pipe. Once the outer pipe is fabricated, it is then connected to the pipe which will provide the fluid. The wire spring is placed between the outer pipe and the inner pipe and then the pipes are telescoped together. The spring may be either placed on the inner pipe or in the outer pipe. If the outer pipe is prefabricated, the spring must be effectively placed between the pipes by prior placement in the outer pipe recess. Finally, the fire sprinkler head is attached, although it may be attached prior to telescoping the pipes together.

Although the connector is described as being suitable for positioning of fire sprinkler heads, it is envisioned it can be used to join a broad range of pipe fittings together while allowing quick connection and disconnection between pipes.

What is claimed is:

1. A pipe connector comprising:
    a male and female pipe having a pair of ends which are positionable in telescopic male-female relation with a radial gap therebetween sufficient to allow limited axial movement;
    sealing means for forming a fluid tight seal between the male and female pipes;
    a planar arcuate wire spring;
    said female pipe having a recess formed adjacent its telescopic end with a section of the recess furthest from its telescopic end forming a shoulder which is adapted to hold a portion of the wire spring against relative movement away from its telescopic end and a section of the recess nearest its telescopic end forming a camming surface, with the wire spring being normally positioned partially within the female pipe recess;
    said male pipe having a positioning recess formed adjacent its telescopic end with a section of the recess furthest from its telescopic end forming a camming surface, and with a section of the recess nearest to its telescopic end forming a shoulder for engaging the wire spring and further having an annular groove located further from its telescopic end than the positioning recess, said annular groove having sufficient depth so that the wire spring when seated therein does not extend beyond the groove sufficiently to bridge the gap; and
    where the relationship between said recesses and the wire spring is such that when the wire spring is seated within the female pipe recess, the wire spring does not bridge the gap, but when the wire spring is seated in the male pipe positioning recess a portion of the wire spring extends beyond the recess a distance greater than the gap.

2. The pipe connector of claim 1 wherein the male pipe is provided with a plurality of axially spaced apart positioning recesses enabling the effective length of the pipe connector to be varied.

3. The pipe connector of claim 2 wherein said sealing means further comprises an O-ring seal retained in a groove formed in the outer periphery of the male pipe, said O-ring sealingly cooperating with the outer periphery of the male pipe and the interior periphery of the female pipe.

4. The pipe connector of claim 3 wherein said O-ring seal is located on the male pipe between the telescopic end and the positioning recess closest thereto.

5. The pipe connector of claim 1 wherein said sealing means further comprises an O-ring seal retained in a corresponding grooved formed in the outer periphery of the male pipe, said O-ring groove sealingly cooperating with the outer periphery of the male pipe and the interior periphery of the female pipe.

6. The pipe connector of claim 5 wherein said O-ring seal is located on the male pipe between the telescopic end and the positioning recess.

7. The pipe connector of claim 1 wherein the wire spring has a circle cross-section.

8. The pipe connector of claim 1 wherein the male and female pipes and the wire spring are generally circular in shape, with the wire spring having an at rest outside diameter greater than the female pipe inside diameter and an at rest inside diameter less than the male pipe outside diameter.

9. The pipe connector of claim 1 wherein the arcuate wire spring extends about the male pipe less than 360° in the at rest state with a sufficient gap formed therein to allow the arcuate wire spring to be inwardly compressed into the release groove sufficiently to enable the male and female pipes to be axially separated.

10. A variable length sprinkler head connector for attaching a sprinkler head to a downwardly depending outlet drop in an overhead supply line mounted above ceiling level, said connector comprising:
    a female pipe having one end adapted to be attached to the outlet drop in the overhead supply line, and a male pipe having one end adapted to be attached to a sprinkler head, said male and female pipes having a pair of ends which are positionable in telescopic male-female relation with a radial gap therebetween sufficient to allow limited axial movement;

sealing means for forming a fluid tight seal between the male and female pipes;

a planar arcuate wire spring;

said female pipe having a recess formed adjacent its telescopic end with a section of the recess furthest from its telescopic end forming a shoulder which is adapted to hold a portion of the wire spring against relative movement away from its telescopic end and a section of the recess nearest its telescopic end forming a camming surface, with the wire spring being normally positioned partially within the female pipe recess;

said male pipe having a plurality of axially spaced apart positioning recesses with a section of each recess furthest from the telescopic end forming a camming surface with a section of each recess nearest to its telescopic end forming a shoulder for engaging the wire spring; and further having an annular groove located further from its telescopic end than the positioning recesses, said annular groove having sufficient depth so that the wire spring when seated therein does not extend beyond the groove sufficiently to bridge the gap; and where the relationship between the female pipe recess and the male pipe positioning recess and the wire is such that when the wire is seated within the female pipe recess, the remainder of the spring extending radially beyond the recess is not sufficient to limit axial movement of the pipes, but when the wire spring is seated in the positioning recess in the male pipe a portion of the wire spring extends sufficiently beyond the recess to engage the female pipe preventing axial separation, enabling the position of the sprinkler head to be adjusted relative to the ceiling by alternatively positioning the wire spring in various recesses in the male pipe.

11. The pipe connector of claim 10 wherein said sealing means further comprises an O-ring seal retained in a groove formed in the outer periphery of the male pipe, said O-ring sealingly cooperating with the outer periphery of the male pipe and the interior periphery of the female pipe.

12. The pipe connector of claim 11 wherein said O-ring seal is located on the male pipe between the telescopic end and the positioning recess closest thereto.

13. The pipe connector of claim 10 wherein the male and female pipes and the wire spring are generally circular in shape, with the wire spring having an at rest outside diameter greater than the female pipe inside diameter and an at rest inside diameter less than the male pipe outside diameter.

14. The pipe connector of claim 10 wherein the arcuate wire spring extends about the male pipe less than 360° in the at rest state with a sufficient gap formed therein to allow the arcuate wire spring to be inwardly compressed into the release groove sufficiently to enable the male and female pipes to be axially separated.

* * * * *